United States Patent [19]

Takasu et al.

[11] Patent Number: 5,693,933
[45] Date of Patent: Dec. 2, 1997

[54] DEVICE FOR DTECTING THE SIZE OF AN ORIGINAL DOCUMENT IN A DOCUMENT READER

[75] Inventors: Akira Takasu, Toyokawa; Tatsuya Eguchi, Toyohashi; Shinya Kawanishi, Tenri; Keiichi Okada, Kashihara; Kouichi Furuta, Nara, all of Japan

[73] Assignees: Minolta Co., Ltd.; Sharp Kabushiki Kaisha, both of Osaka, Japan

[21] Appl. No.: 712,153

[22] Filed: Sep. 12, 1996

Related U.S. Application Data

[63] Continuation of Ser. No. 312,706, Sep. 27, 1994, abandoned.

[30] Foreign Application Priority Data

Sep. 28, 1993 [JP] Japan ............................ 5-241840
Sep. 28, 1993 [JP] Japan ............................ 5-241842

[51] Int. Cl.⁶ ...................................... H01L 27/00
[52] U.S. Cl. ........................ 250/208.1; 250/559.2; 250/559.26; 250/559.29; 355/311; 358/488
[58] Field of Search ...................... 250/208.1, 559.2, 250/559.24, 559.26, 559.29, 559.3, 559.31; 358/488; 356/375, 383, 384; 355/311

[56] References Cited

U.S. PATENT DOCUMENTS

| 4,585,332 | 4/1986 | Shenoy | 355/14 R |
| 4,713,550 | 12/1987 | Anzai et al. | 250/560 |
| 4,814,833 | 3/1989 | Matsushita et al. | 355/75 |
| 4,954,846 | 9/1990 | Matsuo et al. | 355/311 |
| 5,010,371 | 4/1991 | Matsuo et al. | 355/313 |
| 5,036,354 | 7/1991 | Miyamoto | 355/75 |
| 5,072,259 | 12/1991 | Ikeda | 355/218 |
| 5,223,904 | 6/1993 | Umezawa | 355/311 |

FOREIGN PATENT DOCUMENTS 4-66968   3/1992   Japan.

*Primary Examiner*—Stephone Allen
*Attorney, Agent, or Firm*—Sidley & Austin

[57] ABSTRACT

A document reading device comprises a plurality of distance sensors, an original document size detection board, and a main unit control board. The plurality of distance sensors measure distance as for each certain position of an original document table. The original document size detection board comprises an EEPROM for storing a threshold value and an original document size detection CPU 1 for implementing a program for original document size detection. The original document size detection board judges the presence or the absence of an original document at each preset position of an original document table by comparing each threshold value from the plurality of distance sensors with the threshold value, detects the size of an original document according to the judging result from the original document size detection board, and outputs data indicative of the detected original document size. The main unit control CPU 2 implements a program for original document reading control.

6 Claims, 15 Drawing Sheets

| | original document size | detection position | | | |
|---|---|---|---|---|---|
| | | standard ① ② ③ | option ④ ⑤ | standard ⑥ ⑦ | option ⑧ |
| standard detection size | A3T | ○ ○ ○ | ○ ○ | ○ ○ | ○ |
| | B4T | ○ ○ ○ | ○ ○ | ○ × | × |
| | A4T | ○ ○ ○ | ○ × | × × | × |
| | B5T | ○ ○ × | × × | × × | × |
| | A4Y | ○ × × | × × | ○ ○ | ○ |
| | B5Y | × × × | × × | ○ × | × |
| | A5T | ○ × × | × × | × × | × |
| option | 11 * 17 | ○ ○ ○ | ○ ○ | ○ ○ | × |
| | legal(8.5 * 14) | ○ ○ ○ | ○ ○ | × × | × |
| | letterT(8.5 * 11) | ○ ○ ○ | × × | × × | × |
| | letterY(8.5 * 11) | ○ × × | × × | ○ ○ | × |

Fig. 8

| original document size | original document size code ||||
| --- | --- | --- | --- | --- |
| | DATA0 | DATA1 | DATA2 | DATA3 |
| A3T | ○ | ○ | ○ | ○ |
| B4T | ○ | ○ | ○ | × |
| A4T | ○ | ○ | × | ○ |
| B5T | ○ | ○ | × | × |
| A4Y | ○ | × | ○ | ○ |
| B5Y | ○ | × | ○ | × |
| A5T | ○ | × | × | ○ |
| 11 * 17 | ○ | × | × | × |
| 8.5 * 14 | × | ○ | ○ | ○ |
| FLS(8.5 * 13) | × | ○ | ○ | × |
| letter T(8.5 * 11) | × | ○ | × | ○ |
| letter Y(8.5 * 11) | × | ○ | × | × |
| — | × | × | ○ | ○ |
| — | × | × | ○ | × |
| no paper | × | × | × | ○ |
| sensor error code | × | × | × | × |

DEVICE FOR DTECTING THE SIZE OF AN ORIGINAL DOCUMENT IN A DOCUMENT READER

This application is a continuation of application Ser. No. 08/312,706, filed Sep. 27, 1994.

BACKGROUND OF THE INVENTION

(1) Field of the Invention

The present invention relates to an original document reading device employed by a copy machine or the like, particularly to an original document reading device which is capable of automatically detecting the size of an original document.

(2) Description of Related Art

Generally, an original document reading device constructed in copy machines or the like can detect the size of an original document automatically. According to detected original document size, the size of copy sheet to be supplied is selected with a copy machine.

According to a general method of detecting original document size, an original document reading device has a plurality of reflective photo sensors beneath an original document table, and it detects document size according to the light intensity sensed by each photo sensor.

For example, Japanese Laid-Open Patent Application No. 4-66968 discloses a copy machine which has a plurality of photo sensors each consisting of a light emitter and a light sensor which are positioned beneath an original document table. Electric signal is outputted according to the light intensity sensed by the light sensor of each photo sensor, and it is inputted to an input port of a main unit control CPU for controlling the operation of the copy machine. The main unit control CPU detects state of electric signal inputted from each photo sensor, detects the size of an original document, and controls the copy machine according to detected original document size.

Such copy machine detects original document size by a control program for main unit control CPU. Therefore, if the number of different document sizes is changed, not only the number of photo sensors but also control program must be adjusted. Once a copy machine is completed and is put on a market; however, original document size which can be detected by the copy machine cannot be modified any longer. For this reason, use of a copy machine is limited.

Also, the method of detecting original document size from the light intensity sensed by each light sensor has the following problem. The light intensity sensed by each light sensor is easily influenced by the light intensity from the light emitter which changes as time passes or by the density of an original document disposed on the document table. Therefore, accuracy of detecting original document size is degraded in a long period.

SUMMARY OF THE INVENTION

It is a first object of the present invention to provide an original document reading device which can control reading operation effectively even when original document size to be detected is modified or the number of different original document sizes is increased.

It is a second object of the present invention to provide an original document reading device which is capable of detecting the size of an original document precisely in a long period.

The first object may be fulfilled by an original document reading device comprising a transparent original document table which has an area onto which an original document is disposed, a plurality of sensors each for measuring optically as for a certain position of the original document table which corresponds to size of the original document disposed on the original document table, then outputting measuring value, an original document size deciding unit which comprises a memory for storing a threshold value which corresponds to each sensor and a first CPU for implementing a program for original document size detection, for judging if an original document is disposed on each certain position of the original document table by comparing each measuring value from the plurality of sensors with the threshold value, and deciding size of the original document on the original document table according to the judged result, and outputting data representing the decided size of the original document, and a main unit controlling unit which comprises a second CPU for implementing a program for original document reading control, for receiving the data representing the decided original document size from the original document size deciding unit, and controlling operation of the original document reading device.

In this construction, original document size is detected by the first CPU for original document size detection which is constructed separately from the second CPU for original document reading control. Therefore, change of original document sizes to be detected and increase of sensors for original document size detection can be handled easily without influencing the program of the second CPU for original document reading control.

Each sensor may comprise a light emitting element and a location detecting element, and measure a distance as for each preset position of the original document table.

The first object may also be fulfilled by an original document reading device comprising a transparent original document table which has an area onto which an original document is disposed, a plurality of distance sensors each for optically measuring distance as for a certain position of the original document table which corresponds to size of the original document disposed on the original document table, then outputting measuring value, an original document size deciding unit for deciding the original document size according to output signal from each of the plurality of distance sensors, and outputting data indicative of the decided original document size, and a main unit controlling unit for controlling operation of the original document reading device according to the data indicative of the decided original document size from the original document size deciding unit.

Each of the plurality of distance sensors may comprise a light emitting element for emitting light to a preset position of the original document table, and a location detecting element for receiving reflection of the light from the light emitting element, measuring distance to a position where the light is reflected according to a position where the reflection of the light is received, and outputting measuring value.

Each of the plurality of distance sensors may include the plurality of light emitting elements and the single location detecting element in which the plurality of light emitting elements emit light to the different preset positions of the original document table, and the location detecting element receives the reflection of the light emitted from the plurality of light emitting elements, measures the distance to each reflection position according to the position where the reflection of the light is received, and outputs the measuring value.

The second object may be fulfilled by an original document reading device, wherein each sensor comprises a light emitting element and a location detecting element, and measures a distance as for each preset position of the original document table.

The second object may also be fulfilled by an original document reading device comprising a transparent original document table which has an area onto which an original document is disposed, a plurality of distance sensors each for optically measuring distance as for a certain position of the original document table which corresponds to size of the original document disposed on the original document table, then outputting measuring value, an original document size deciding unit for deciding the original document size according to output signal from each of the plurality of distance sensors, and outputting data indicative of the decided original document size, and a main unit controlling unit for controlling operation of the original document reading device according to the data indicative of the decided original document size from the original document size deciding unit.

Each of the plurality of distance sensors may comprise a light emitting element for emitting light to a preset position of the original document table, and a location detecting element for receiving reflection of the light from the light emitting element, measuring distance to a position where the light is reflected according to a position where the reflection of the light is received, and outputting measuring value.

Each of the plurality of distance sensors may include the plurality of light emitting elements and the single location detecting element in which the plurality of light emitting elements emit light to the different preset positions of the original document table, and the location detecting element receives the reflection of the light emitted from the plurality of light emitting elements, measures the distance to each reflection position according to the position where the reflection of the light is received, and outputs the measuring value.

In this construction, the distance information measured by each distance sensor is based on a position of the light sensing element where the light is sensed, and it is hardly influenced by change of the light emitting element which takes place as time passes or the density of an original document on the original document table. Therefore, original document size can be detected accurately for a long time. Compared to conventional mechanism for detecting original document size according to the light intensity, efficiency which is measured by the life time of a sensor and the tolerance of floating of an original document is improved greatly.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows relation between original document size code from the CPU 1 and original document size (including no paper, sensor error code);

DESCRIPTION OF PREFERRED EMBODIMENTS

An embodiment of the present invention is described.

[Entire Configuration of Original Document Reading Unit of Copy Machine Main Unit]

Figure 1:
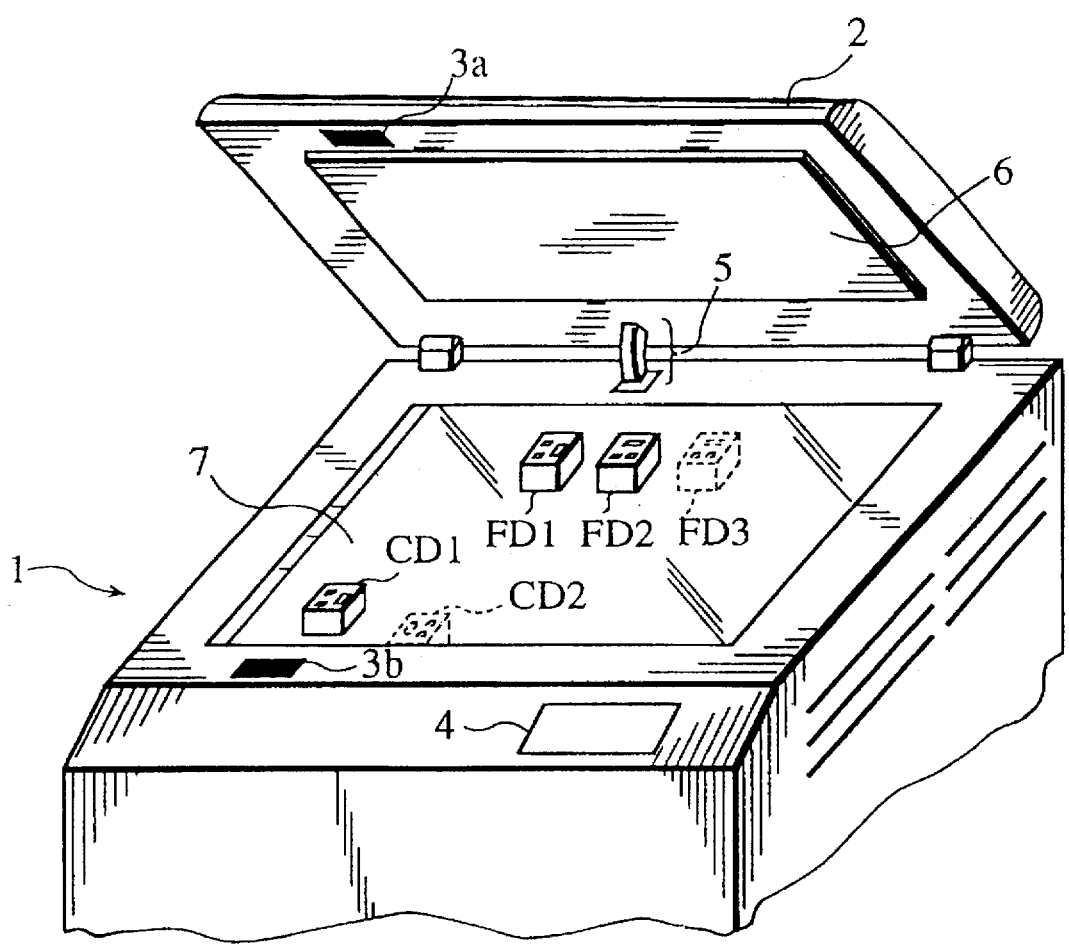
FIG. 1 is a perspective view of an original document reading unit mounted at the upper part of a copy machine main unit relating to a first embodiment.

FIG. 1 is a perspective view of an original document reading unit mounted at the upper part of a copy machine main unit in an embodiment.

The original document reading unit is constructed in the upper part of a copy machine main unit 1 and an image forming unit consisting of a photosensitive drum PC and the like, and a paper feed tray (not illustrated) are constructed in its lower part.

The original document reading unit has a scanning glass 7 on the upper surface of the copy machine main unit 1 onto which an original document is disposed, an original cover 2 for covering an original document on the scanning glass 7, a control panel 4 which is constructed at the front edge of the upper surface of the copy machine main unit 1, an optical system for illuminating an original document on the scanning glass 7 and forming an image on the surface of the photosensitive drum PC from the light rays reflected by the original document, and distance sensor units FD1, FD2, FD3, CD1, CD2 for detecting original document sizes.

Although not illustrated, the optical system is constructed beneath the scanning glass 7, and it comprises a first slider which holds an exposure lamp and a reflection mirror and moves from left to right (hereunder referred to as horizontal direction) along with the scanning glass, and a second slider which holds a reflection mirror and moves in the horizontal direction. Well-known components of the image forming unit, such as a developer, a transcription charger, a cleaner, an eraser, and an anti-static charger are constructed around the photosensitive drum PC, and an electrostatic latent image formed by the optical system on the photosensitive drum PC is converted into a visible toner powder image by the developer. The toner powder image is, then, transcribed on a copy sheet from the paper feed tray, and is affixed to the copy sheet. Then, it is discharged to outside of the copy machine main unit 1. Although not illustrated, a controller for controlling the entire operation of the copy machine main unit 1, such as original document reading and original document size detection, is included in the copy machine main unit 1.

The original cover 2 covers the whole surface of the scanning glass 7. It is mounted on the upper surface of the copy machine main unit 1 to enable the user to open and close the original cover 2 with one end of the original cover 2 being axis. In this manner, the scanning glass 7 is opened and closed when the user opens and closes the original cover 2. A white color original presser 6 is mounted on the lower surface of the original cover 2. When the original cover 2 is closed, the original presser 6 presses an original document to the scanning glass 7. Also, a magnet 3a is mounted on the lower surface of the original cover 2, and a lead switch 3b is mounted on the upper surface of the copy machine main unit 1 to correspond to the magnet 3a in the original cover 2. When the original cover 2 is closed, the magnet 3a is in contact with the lead switch 3b, and original cover close signal indicative of the close of the original cover 2 is transmitted to the controller.

An opening angle detecting unit 5 is provided between the rear part of the original cover 2 and the copy machine main unit 1 for detecting if the opening angle of the original cover 2 relative to upper surface of the copy machine main unit 1 is smaller than standard angle. When the opening angle is smaller than standard angle, the opening angle detecting unit 5 transmits an original cover standard angle signal. The opening angle detecting unit 5 may have various configurations. For example, it may comprise an actuator in the original cover 2 and a single photo interrupter in the copy machine main unit 1.

(Description of Distance Sensor Unit)

As shown in FIG. 1, the distance sensor units FD1, FD2, FD3, CD1, CD2 are constructed at predetermined positions beneath the scanning glass 7. The distance sensor units FD1, FD2, FD3 at predetermined positions detect original document size in the horizontal direction; and the distance sensor units CD1 and CD2 at predetermined positions detect original document size in the vertical direction being perpendicular to the horizontal direction. The distance sensor units FD3 and CD2 are optional.

Figure 2A:
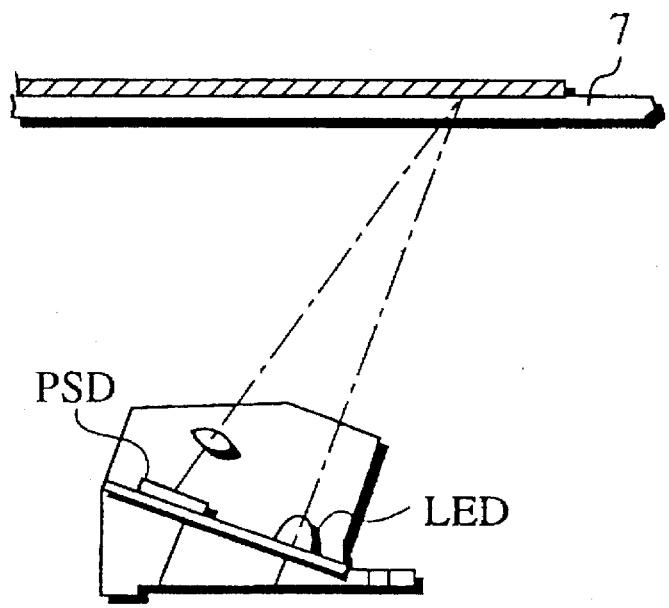
FIGS. 2a and 2b show the configuration of a distance sensor unit in FIG. 1, and light emitting and sensing operations, with FIG. 2a being an elevational view, partly in cross section, and FIG. 2b being a plan view.
Figure 2B:
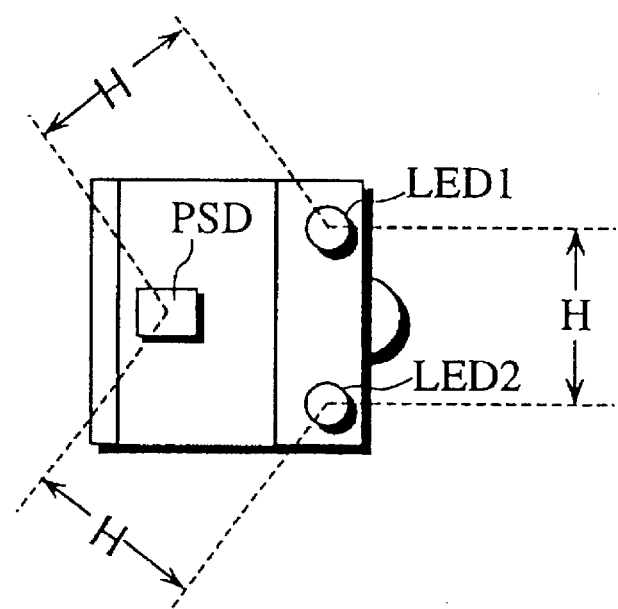

FIGS. 2 (a) and (b) show the configuration of each distance sensor unit in FIG. 1, and how the light rays are emitted and sensed by it. FIGS. 2 (a) and (b) show the distance sensor unit viewed from side and top respectively. Each distance sensor unit comprises a couple of light emitting devices (LEDs 1, 2) and a single photo sensing device (PSD). With the thus constructed distance sensor unit, reflection of the light rays from the LED1 and reflection of the light rays from the LED2 are sensed by the single PSD, and the distance to each position can be detected.

Figure 3:
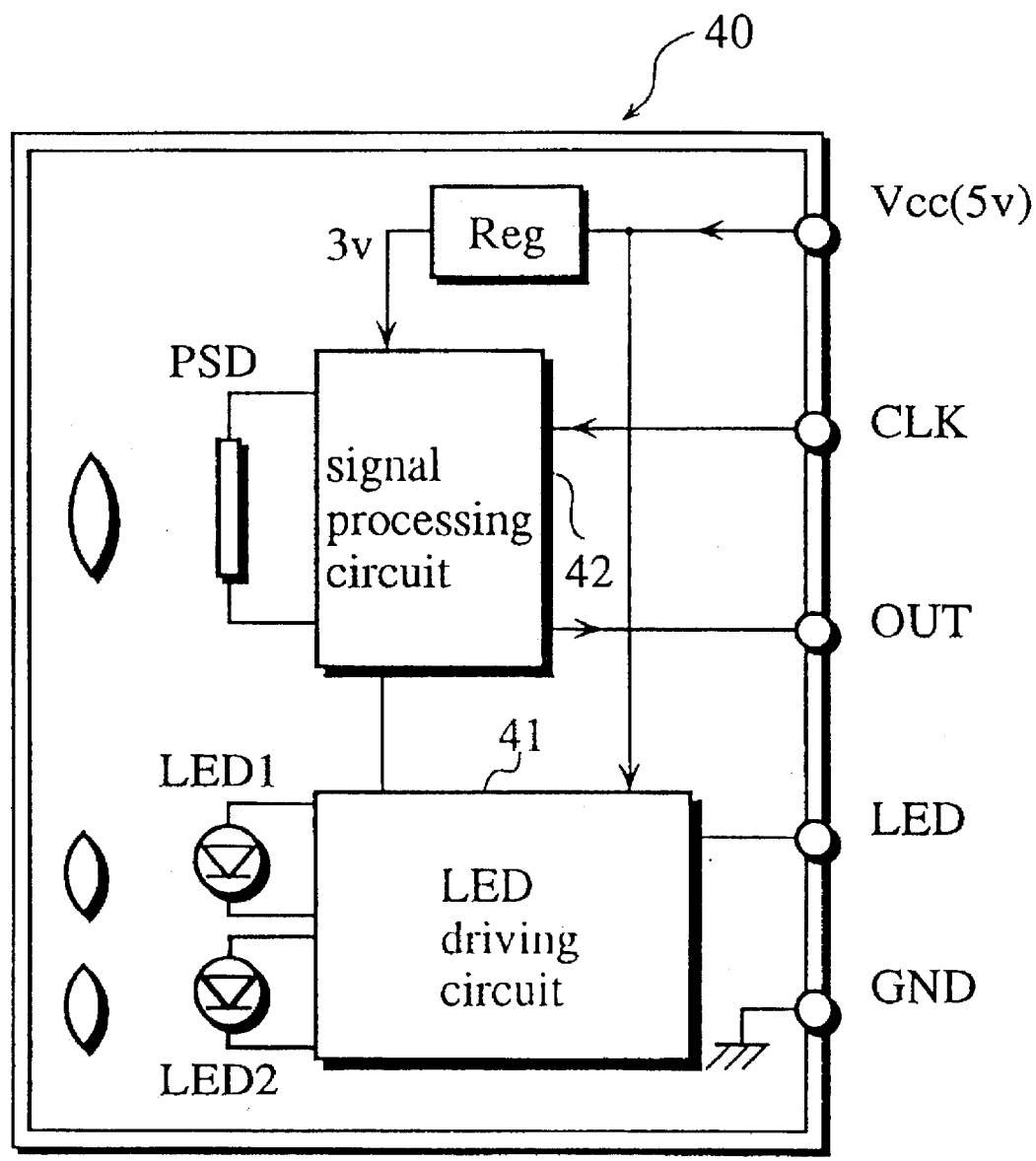
FIG. 3 shows the configuration of a sensor control circuit embedded in each distance sensor unit in FIG. 1.

FIG. 3 shows the configuration of a sensor control circuit included in each distance sensor unit in FIG. 1. As shown in FIG. 3, a sensor control circuit 40 comprises an LED driving circuit 41 for driving the LED 1 and LED 2, and a signal processing circuit 42 for converting analog detection signal from the PSD into digital signal. According to state of LED signal inputted from controller of the copy machine main unit 1 into the LED driving circuit 41, the sensor control circuit 40 controls either the LED1 or the LED2 to illuminate. The light rays from the LED 1 or the LED 2 and reflected by an object to be detected are inputted to the PSD and are sensed by the same. According to position of the PSD where the reflected light rays are sensed, the distance to the object is detected.

The PSD outputs analog detection signal which corresponds to detected position. This analog detection signal is converted into digital signal by the signal processing circuit 42, and is outputted as sensor output signal (sensor data) being in synchronous with clock signal CLK.

FIG. 2 (a) shows disposition of distance sensor units. To make the PSD sense the light rays reflected by an original document randomly, the LEDs 1 and 2 of each distance sensor unit illuminate an original document diagonally.

Further, as shown in FIG. 2 (b), the PSD, LED1, and LED2 are positioned to form a regular triangle so that the LED1 and the LED2 are distant from the PSD by same distance. Because of such regular triangle disposition, the PSD can sense the light from the LED 1 and the LED 2 equally. That is, the PSD can receive data about two detection positions equally; consequently, the difference between two detection values is minimized. Therefore, more effective threshold value can be set, whereby original document size is detected more accurately.

On the other hand, if the distance between the PSD and the LED1 is very different from the distance between the PSD and the LED2, there will be a big difference between two detection values.

Figure 4:
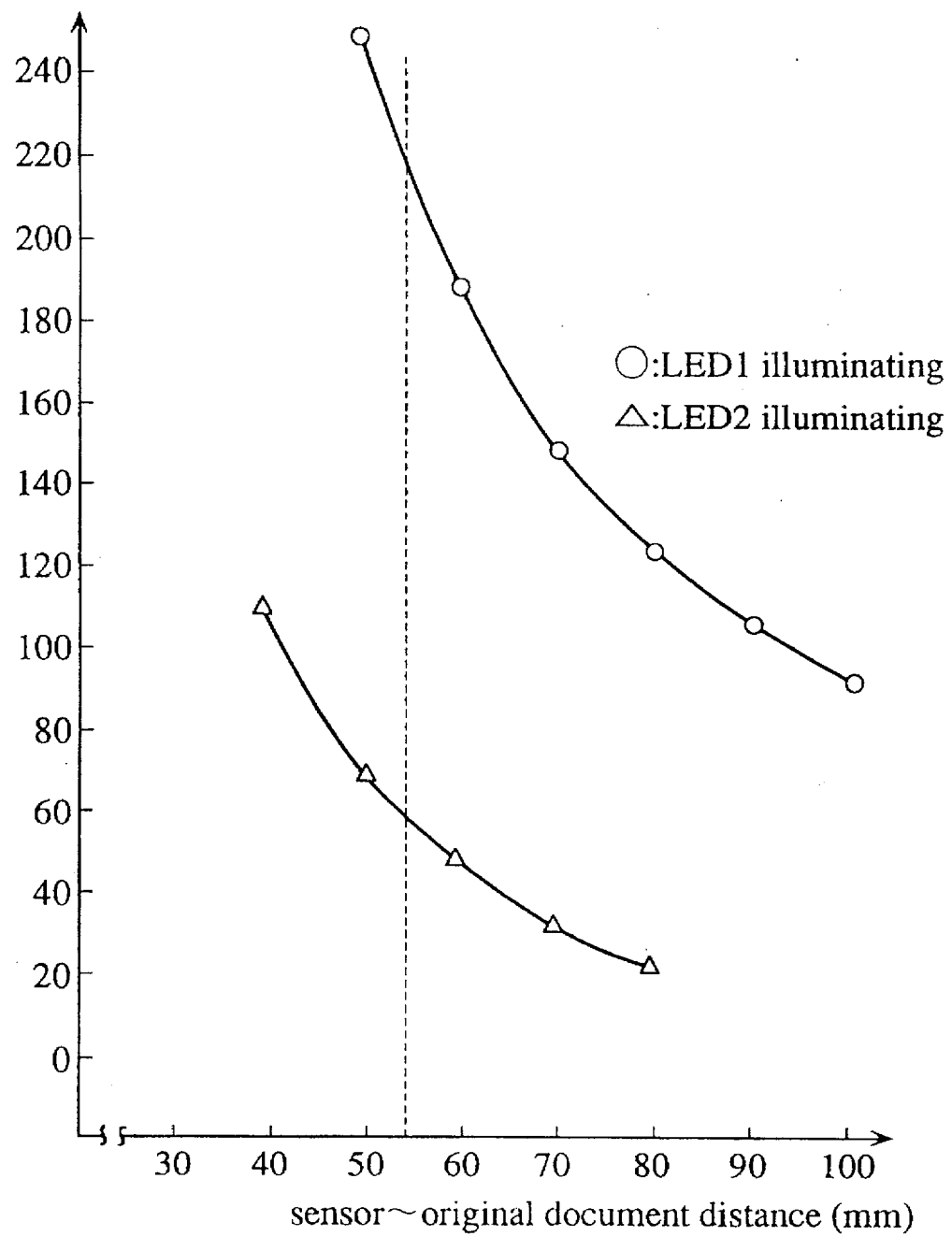
FIG. 4 is a graph showing relation between the distance from sensor to original document and sensor output value when the distance between PSD and LED 2 is 30 mm, and the distance between PSD and LED 1 is 60 mm which is twice longer than the distance between PSD and LED 2.

For example, FIG. 4 is a graph showing relation between the distance from sensor to original document and sensor output value when the distance between the PSD and the LED 2 is 30 mm and the distance between the PSD and the LED 1 is 60 mm, which is twice longer than the distance between the PSD and the LED 2. When sensor is distant from original document by 55 mm, output of the LED 1 is around 60 DEC while output of the LED 2 is around 220 DEC during light emitting. Thus, these two detection values are very different from each other.

Further, by placing the PSD, LED 1, LED 2 on a regular triangle, a sensor unit can be sized down, so that it can be mounted on device more freely.

In the thus constructed distance sensor units FD1-3, CD1-2, the LED 1 and LED 2 of each distance sensor unit illuminate predetermined positions of an original document disposed on the scanning glass 7; the reflected light rays are sensed by the PSD; and sensor data corresponding to position of the PSD at which the light rays are sensed is outputted (the sensor units FD 1 and FD 2 employs only one of the light rays, and ignores the other ray). Although we will see below the detailed description, the controller compares output value of this sensor data with a preset threshold value to judge if an original document is disposed on a certain position of the scanning glass 7.

Figures 5A, 5B:
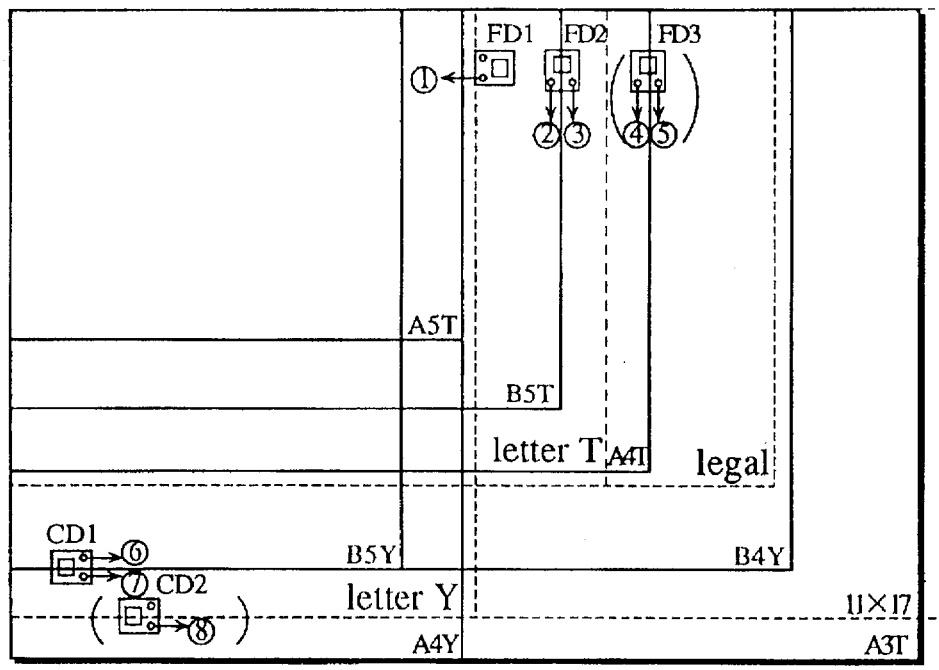
FIG. 5 (a) shows relation between disposition of distance sensor units and original document sizes, and FIG. 5 (b) is a table corresponding the presence/absence of an original document which is judged according to sensor data corresponding to each LED of each distance sensor unit with original document size.

Disposition of each distance sensor unit and a method of detecting original document size with controller of the copy machine main unit 1 are described. FIGS. 5(a) shows relation between disposition of distance sensor units and original document sizes. FIGS. 5(b) is a table where the presence or absence of an original document which is detected from sensor data for each LED of distance sensor unit is related to original document size. This table is held by the controller.

As shown in FIG. 5(a), the distance sensor units FD 1–3, CD 1, 2 are positioned corresponding to original document sizes. By illuminating positions (1)–(8) which correspond to original document sizes with the LEDs 1, 2 of each distance sensor unit, the presence or absence of an original document at positions (1)–(8) is detected. Each "o" in FIG. 5(b) represents the presence of an original document at the positions (1)–(8) in FIG. 5(a), while "x" represents the absence of an original document at the positions (1)–(8).

The controller detects original document size as referring to the presence or absence of an original document at the positions (1)–(8) which is detected according to sensor data from the distance sensor units FDs 1–3, CDs 1, 2 and the table.

As for device destined for Japanese market, original document size is basically measured by centimeter. Further, it is often demanded by foreign capital companies to detect document size by inch as well; therefore, the optional distance sensor units FD 3 and CD 2 are included to detect original document size by inch besides the basic sensor units FDs 1, 2 and CD 1 for detecting original document size by centimeter.

So far has been described about distance sensor units. These distance sensor units are hardly influenced by the light intensity, so that high detection accuracy of original document size is assured for a long time. For example, demanded accuracy is assured for the life-time of 5 years, that is 24 hours*365 days*5 years=43,800 hours (about 50,000 hours), with the tolerance of more than 0.80 for the original document density O.D [$-\log_{10}$ (reflection rate of original document)], and more than 5 mm for the floating of an original document above the scanning glass 7.

Compared to conventional sensors for detecting in accordance with the light intensity by which demanded accuracy is assured for the life-time of 12,000 hours with the tolerance of 0.25 for the original document density O.D and 3 mm for the floating of an original document above the scanning glass 7, the distance sensor units in the present invention are much more effective. Further, conventional circuit for turning ON/OFF sensors in synchronous with main switch is omitted in the present invention.

(Description of Controller)

Figure 6:
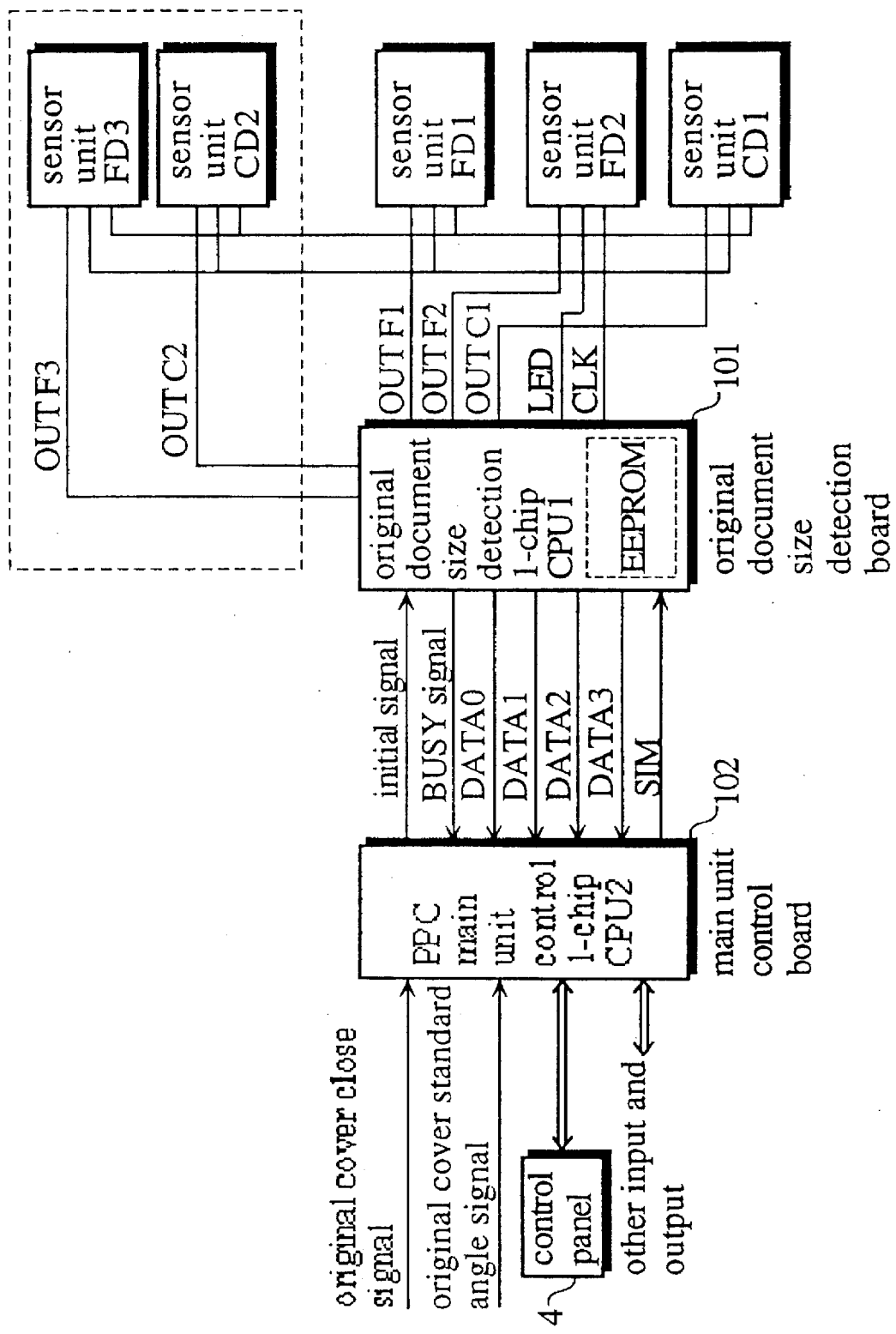
FIG. 6 is a block diagram depicting a controller of a copy machine main unit 1.

FIG. 6 is a block diagram depicting the controller of the copy machine main unit 1. As shown in FIG. 6, the controller comprises an original document size detection board 101 including one-chip CPU 1 for document size detection and a main unit control board 102 including one-chip CPU 2 for main unit control.

The CPU 1 further comprises an EEPROM, and a threshold value with which the CPU 1 detects the presence and absence of an original document, and the table in FIG. 5 (b) with which the CPU 1 detects original document size are stored in the EEPROM.

Thus, since the EEPROM is included in the CPU 1, threshold data does not need to be exchanged between the CPUs. Also, the CPU 1 can operate all the processing about document size detection, so that the CPU 2 for main unit control can judge original document size simply by retrieving data from the CPU 1. Therefore, burden of the CPU 2 is reduced.

Data transfer between the CPU 1 and the CPU 2 is described. The CPU 1 outputs LED signal set forth above and clock signal CLK to each of the distance sensor units FDs 1–3, and CDs 1, 2. The LED 1, 2 of each distance sensor unit illuminate in synchronous with LED signal, and outputs sensor data OUTF1, OUTF2, OUTF3, OUTC1, OUTC2 to the CPU 1 in synchronous with clock signal CLK.

Figure 7:
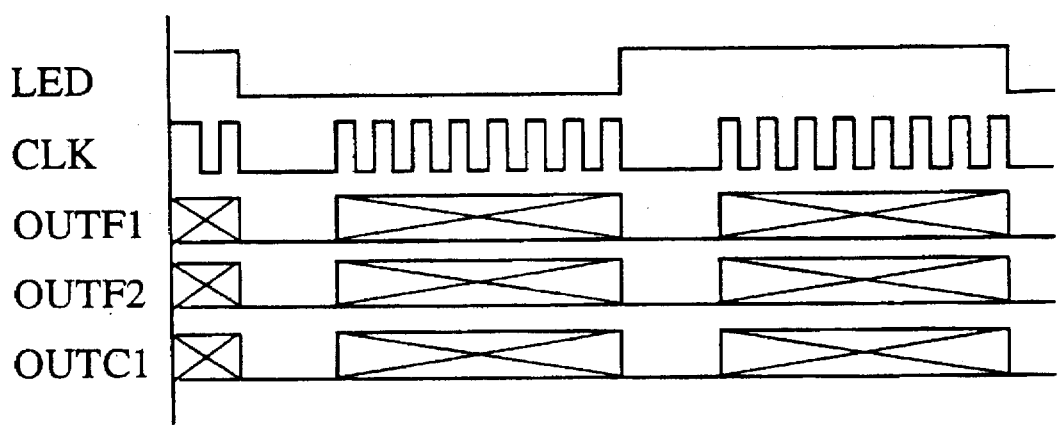
FIG. 7 is a time chart showing clock signal CLK generated by an original document size detection CPU 1 and reception timings of LED signal and sensor data from each distance sensor unit.

FIG. 7 is a time chart showing the timings at which clock signal CLK and LED signal from the CPU 1 in FIG. 6 and sensor data from each distance sensor unit are received. As shown in FIG. 7, ON/OFF of LED signal is switched in a cycle which is several times longer than that of clock signal CLK. According to LED signal, the LEDs 1, 2 of each distance sensor unit illuminate alternatively. Therefore, being coupled with the switching of LED signal between ON/OFF, signal relating to a position illuminated by the LED 1, and signal relating to a position illuminated by the LED 2 are provided to sensor data OUTF1–3, OUTC 1–2 alternatively (to be noted, the distance sensor units FD1 and CD2 use only one of the LEDs, so that signal relating to the selected single LED is provided to the sensor data OUTF 1 and OUTC 2).

FIG. 8 shows correspondence between original document size code and original document size (including no paper, and sensor error code).

According to detected original document size, the CPU 1 generates 4 bit original document size code (DATA0–3 in FIG. 6), and transmits it to the main unit control CPU 2. As shown in FIG. 8, original document size can be judged according to original document size code DATA 0–3. At the timing that the CPU 2 detects that the original cover 2 is closed to standard angle according to original cover standard angle signal from the opening angle detecting unit 5 (see FIG. 1), the CPU 2 latches original document size code DATA0–3, and judges original document size.

Figure 9:
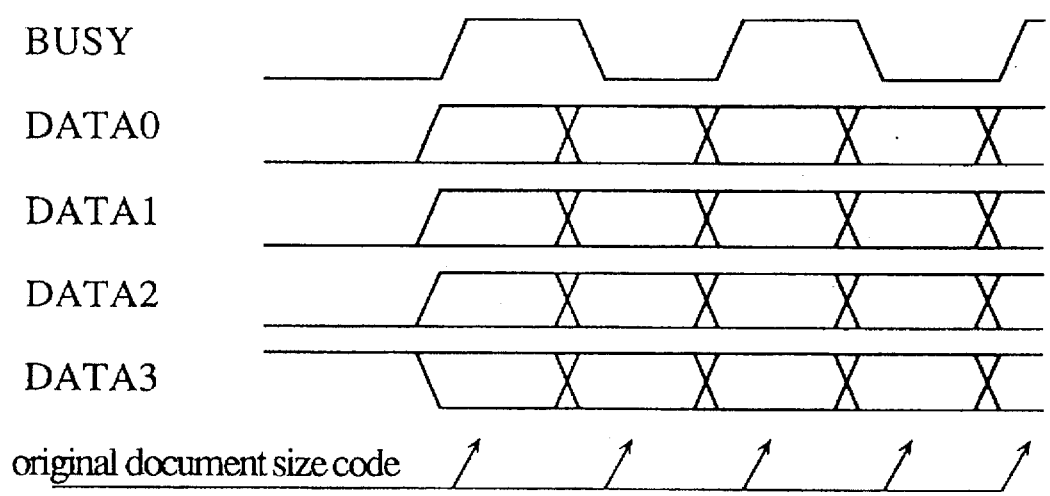
FIG. 9 is a time chart showing transfer timing of original document size code DATA 0-3.

FIG. 9 is a time chart showing the timings at which original document size code DATA0–3 is transferred. As shown in FIG. 9, original document size code DATA 0–3 is transferred from the CPU 1 to the CPU 2 in synchronous with BUSY signal pulse.

As shown in FIG. 6, an "initial signal" which directs the CPU 1 to operate initial processing, and an "SIM signal" which directs the CPU 1 to set initial mode are transferred from the CPU 2 to the CPU 1.

(Description of Initial Processing)

Figure 10:
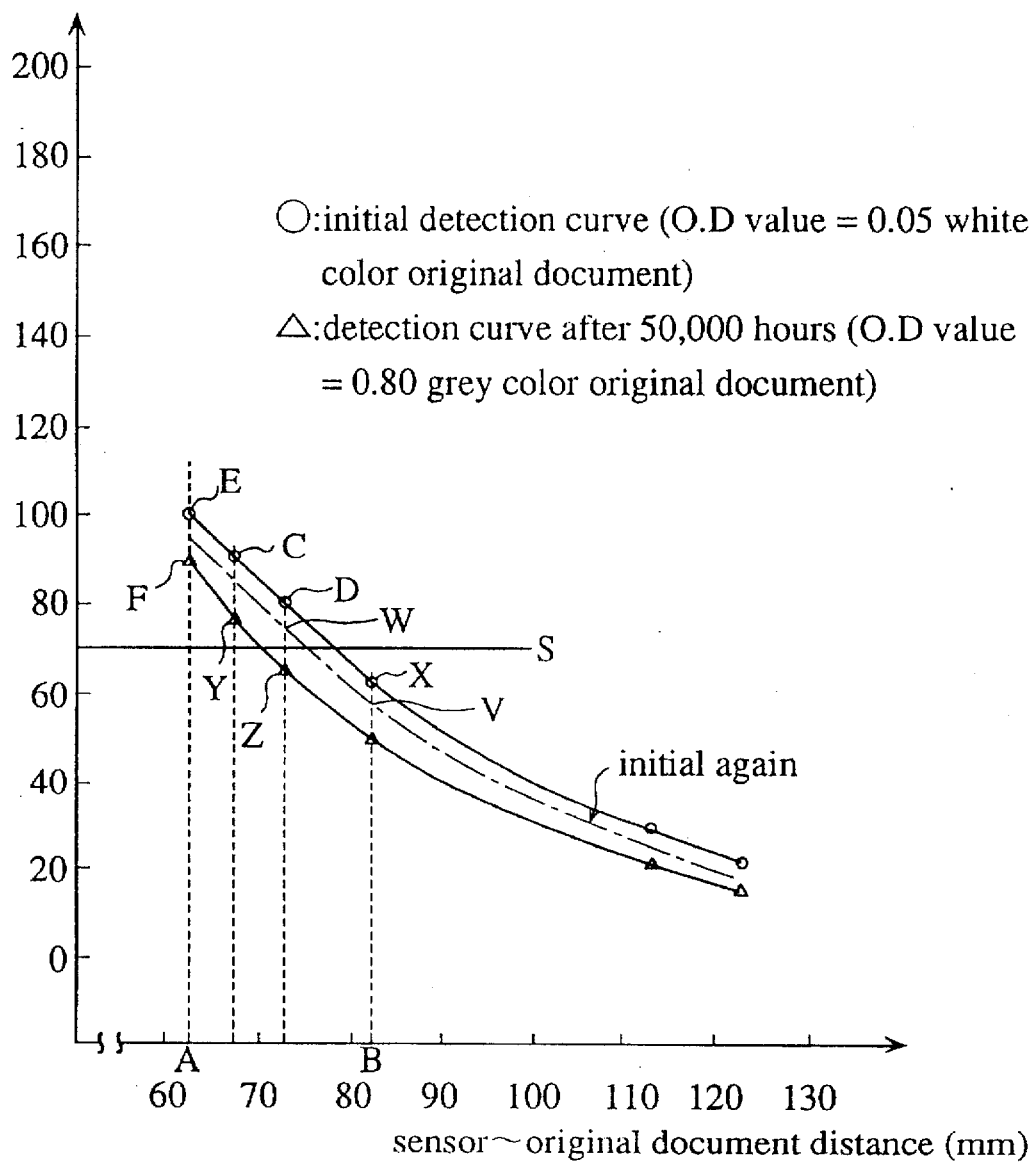
FIG. 10 shows characteristics of sensor output value from distance sensor unit at initial stage and 50,000 hours later.

Initial processing is described. FIG. 10 shows characteristics of output value outputted from distance sensor unit as sensor data at initial stage and 50,000 hours later. In FIG. 10, a distance A is the distance between a sensor unit and an original document which is disposed on the scanning glass without any space; and a distance B is the distance between a sensor unit and the original cover 2 when data is latched.

Since detection is operated with the tolerance of 0.80 for the document density O.D and 5 mm for the floating of an original document above the scanning glass 7 in 50,000 hours, FIG. 10 includes both an original document detection curve for a white color document with 0.05 for the document density O.D at initial stage and an original document detection curve for a grey color document with 0.8 for the document density O.D 50,000 hours later.

It is assumed that sensor output value does not change as time passes when a sensor detects a white color original document. In this case, if a threshold value S is set between output value for the distance A and output value for the distance B, output value (point E) during data latch is greater than the threshold value S if the sensor detects the presence of a white color original document, and output value (point X) is smaller than the threshold value S if the sensor detects the absence of a white color original document. Therefore, the presence/absence of an original document can be judged by comparing sensor output value from each distance sensor unit with the threshold value S.

When an original document floats above the scanning glass 7 by 5 mm, point C and Y represent sensor output values at initial stage and 50,000 hours later respectively. Therefore, with the tolerance of 5 mm for the floating of an original document above the scanning glass, and with the life-time of 50,000 hours, threshold value S should be set between sensor output value (point Y) with an original document floating by 5 mm 50,000 hours later and sensor output value (point X) with no original document at initial stage. By setting such threshold value S, the presence/absence of a grey color original document with 0.8 for the document density O.D can be detected with the tolerance of 5 mm floating and with the lifetime of 50,000 hours without another initial processing.

If threshold value is set between sensor output value (point Z) with an original document floating by 10 mm 50,000 hours later and sensor output value (point X) with no original document, it is also possible to detect the presence/absence of a grey original document with 0.8 for the document density O.D which is floating by 10 mm 50,000 hours later. However, as shown in FIG. 10, the margin between these two sensor outputs (point Z and point X) is very small. Therefore, with the tolerance of 0.80 for the document density O.D of a grey original document and 10 mm for floating, an error occurs in data latch as the original cover 2 is transformed as time passes.

By repeating initial processing several times in 50,000 hours, threshold value can be determined within sufficient margin even with the tolerance of 10 mm for floating. The reason for this is described as referring to FIG. 10. As the difference of sensor output values between a white original document and a grey original document is relatively small, it is ignored for convenience of the description.

For example, with a detection curve shown by a dashed line, if it is planned to repeat initial processing, the first threshold value is set between a sensor output value (point W) and a sensor output value (point X), and the second threshold value is set between a sensor output value (point Z) and a sensor output value (point V). Compared to a single initial processing in 50,000 hours for setting threshold value between two sensor output values (point Z and X), a broader margin can be obtained. Although not illustrated, the more initial processing is repeated, the broader margin can be obtained.

(Operation of Copy Machine Main Unit 1)

The operation is described as referring to flow charts.

Figure 11:
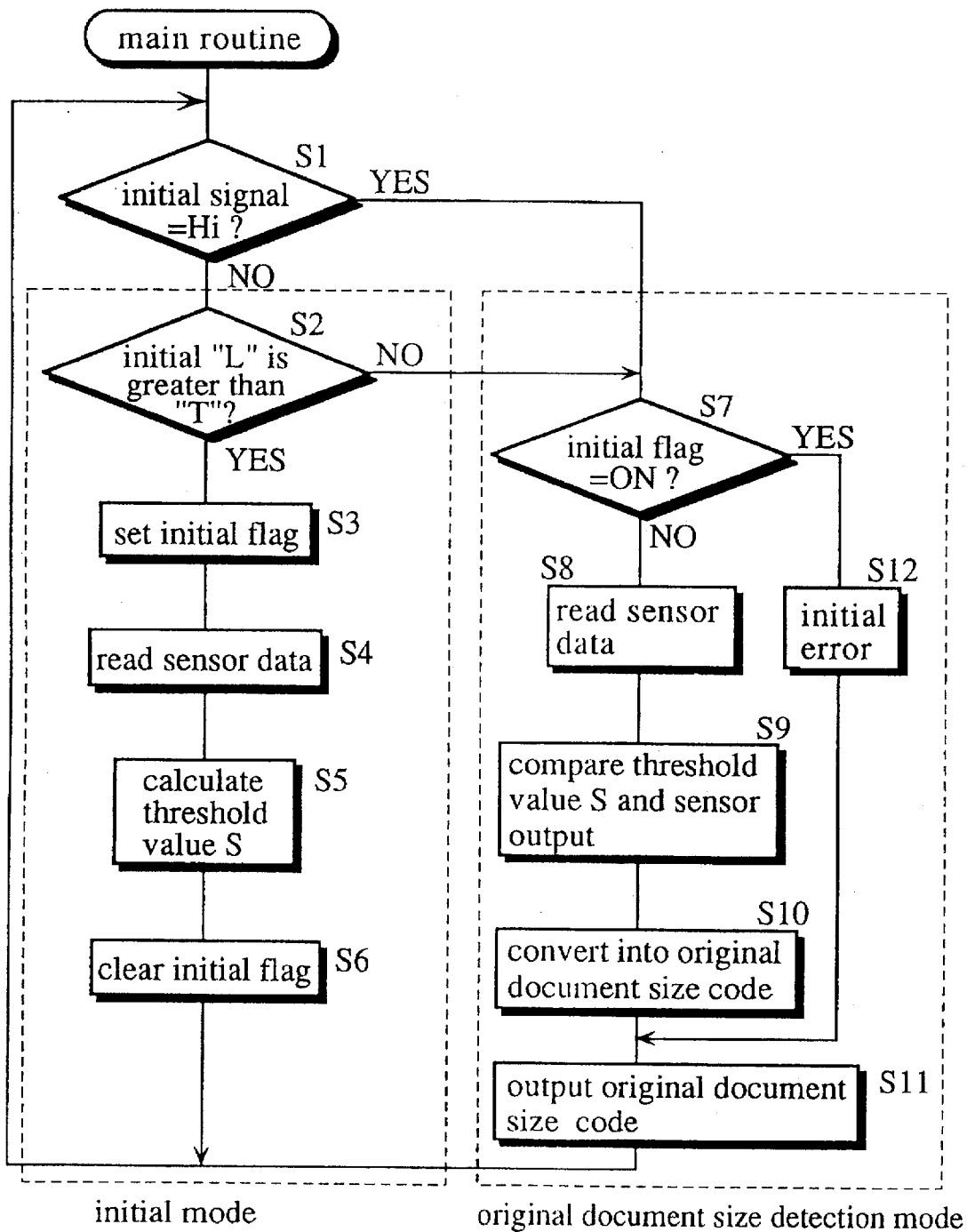
FIG. 11 is a flow chart depicting the main routine of control of the original document size detection CPU 1.

FIG. 11 is a flow chart depicting the main routine of control of the original document size detection CPU 1. The CPU 1 operates according to this flow chart so that reading unit operates initial processing (initial mode enclosed with a dot line in FIG. 11) and original document size detection (original document size detection mode enclosed with another dot line in FIG. 11).

Initial signal from the CPU 2 being active (LOW) (S1: No) and being longer than standard time T (S2: Yes) indicates that it is set ON (initial processing is directed) so that initial mode processing is executed. This standard time T is included to eliminate noise. About 0.5 sec standard time T eliminates noise sufficiently, and it does not degrade the processing speed.

Figure 12:
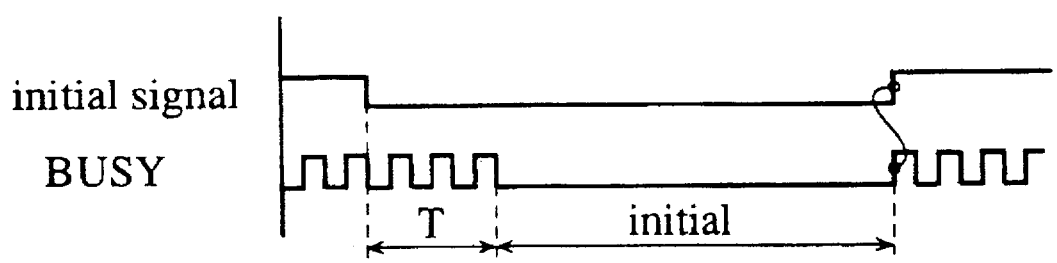
FIG. 12 shows data transfer timing of initial signal and BUSY signal.

Upon each start of initial processing, BUSY signal to the CPU2 is set LOW level (remains LOW level during initial processing), and initial flag indicative of initial processing is set ON (S3). FIG. 12 shows data transfer timings of initial signal and BUSY signal.

Sensor data is read from each distance sensor unit (S4). A threshold value S for the LEDs 1 and 2 of each distance sensor unit is calculated from each sensor data, and it is written into the EEPROM (S5). It is possible to write sensor data into the EEPROM beforehand, and calculate a threshold value when detecting the presence/absence of an original document. However, it is more desirable to write a threshold value into the EEPROM after calculation so that the presence/absence of an original document can be detected at a higher speed.

Subsequently, initial flag is reset OFF to complete initial processing (S6). When initial processing is completed, BUSY signal is provided to the CPU 2 again.

On the other hand, initial signal from the CPU 2 being inactive (Hi) (S1: Yes) indicates that initial processing is not directed; accordingly, original document size detection mode starts to detect original document size. Even when initial signal from the CPU 2 is active (LOW), that is set ON (S1: NO), the initial signal indicates an error if it is shorter than standard time T (S2: NO). Accordingly, it is judged that initial processing is not directed, and original document size detection mode starts.

In original document size detection mode, initial flag is examined first. Initial flag being set ON (S7: Yes) indicates that an error occurs during initial processing, so that error code is outputted (S12).

Initial flag is set ON by inactive initial signal as power is turned off or the original cover 2 is opened during initial processing at S3–S6. In many cases, a threshold value in the EEPROM is not appropriate. The initial flag=ON (set) represents a default value, and it is reset only when initial processing is completed without any error. Therefore, whether or not initial mode processing has been completed safely can be detected as referring to ON/OFF of this initial flag.

Initial flag being OFF (S7: No) represents that initial processing has been completed safely, so that sensor data is read from each distance sensor unit (S8).

By comparing a sensor output value of retrieved sensor data with a threshold value, the presence/absence of an original document at positions (1)–(8) is judged (S9). Then, original document size is determined as referring to this judging result and original document size table. Original document size is then converted into code (S10), and it is transferred to the CPU 2 (S11).

Figure 13:
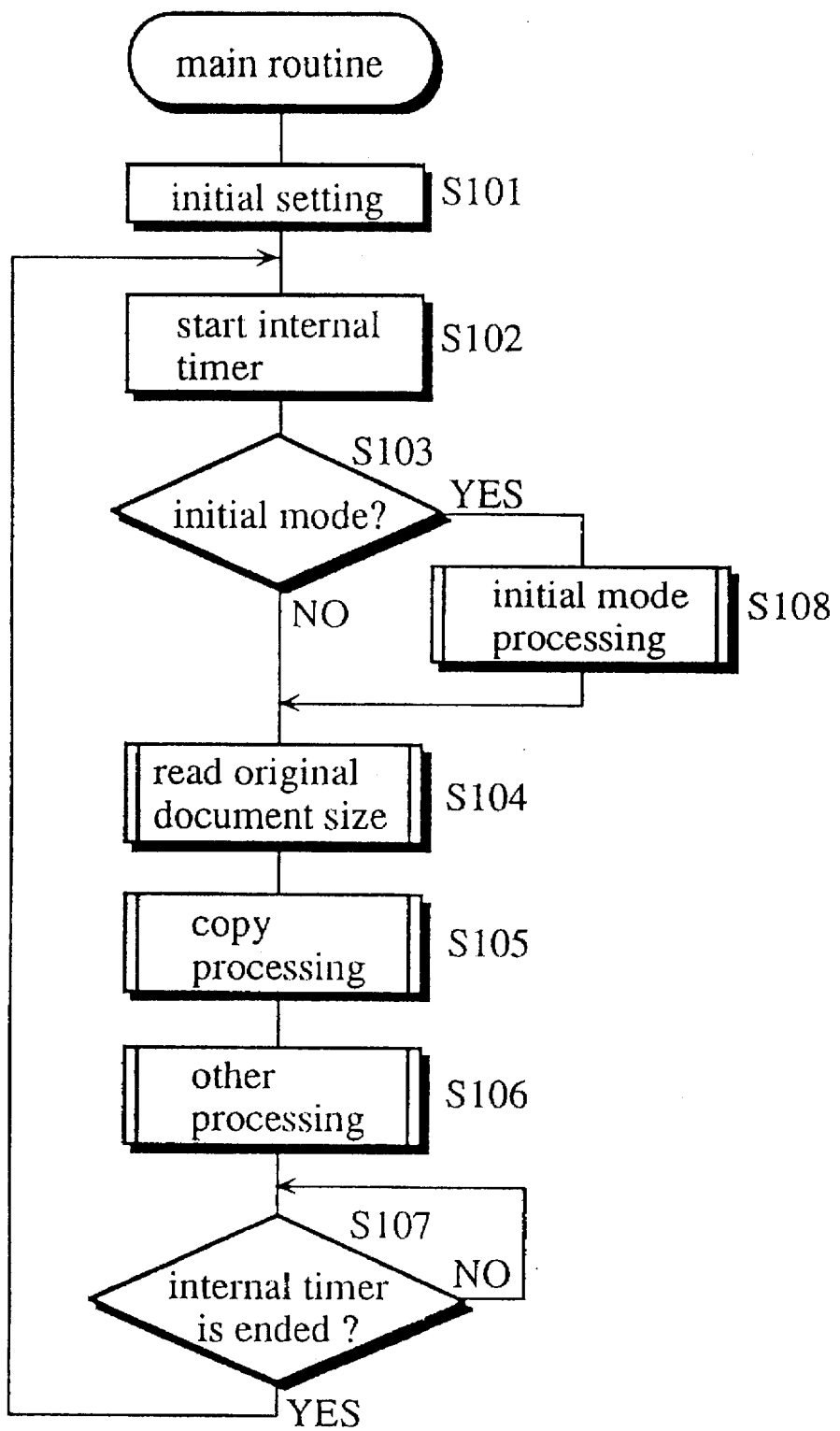
FIG. 13 is a flow chart depicting the main routine of control of a main unit control CPU 2.

FIG. 13 is a flow chart depicting the main routine of control of the main unit control CPU 2. The operation of the copy machine main unit 1 is described as referring to this flow chart.

After conducting various initial settings (S101), the CPU 2 starts internal timer (S102), and judges if the user directs initial mode (by pressing specific key of the control panel 4) (S103). If initial mode is directed (S103: Yes), the CPU 2 implements the initial mode sub-routine (S108).

If initial mode is not directed (S103: No), the original document size reading sub-routine is conducted, and copy processing or the like is conducted as usual (S104–S106).

Figure 14:
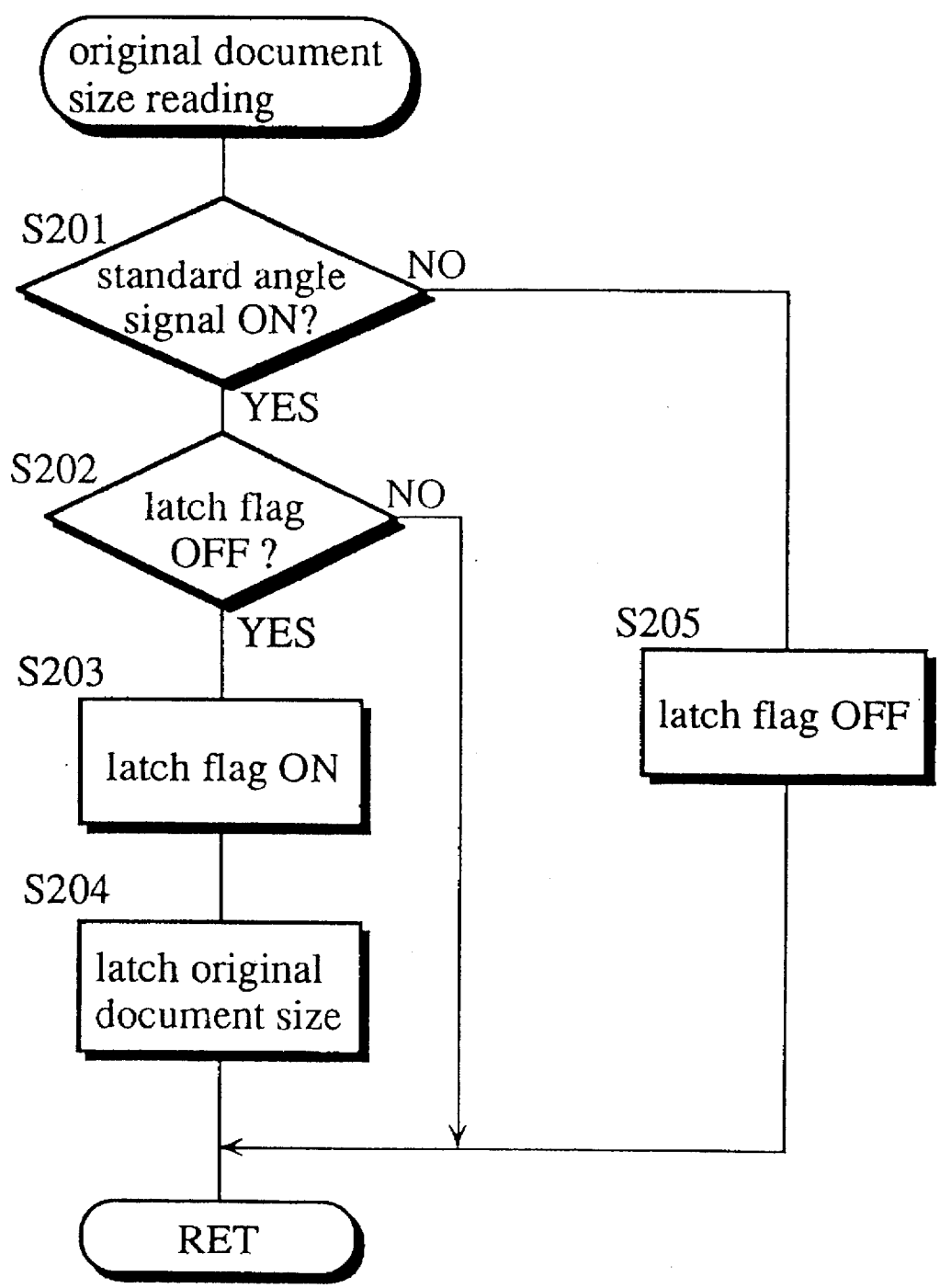
FIG. 14 is a flow chart depicting the original document size reading subroutine at S104 in FIG. 13.

FIG. 14 is a flow chart depicting the original document size reading sub-routine at S104 in FIG. 13. According to this flow chart, the main unit control CPU 2 latches original document size code from the original document size detection CPU 1 as follows.

Upon start of original document size reading mode, the CPU 2 judges if the opening angle of the original cover 2 is smaller than standard angle by examining original cover standard angle signal from the opening angle detecting unit 5 (S201). Original cover standard angle signal being ON (S201: Yes) represents the opening of the original cover 2 being smaller than standard angle, then latch flag is examined (S202). Latch flag being OFF is set to ON (S203) to latch original document size code (S204).

Latch flag directs to latch original document size code after the original cover 2 is closed so that its opening angle becomes standard. More specifically, latch flag being set ON at S202 indicates that original document size code is latched after the opening angle of the original cover 2 became standard angle, so that processing at S203 and S204 is not conducted.

When the original cover 2 is opened by more than standard angle (S201: No), latch flag is reset OFF (S205). In this way, original document size data can be latched when the opening angle of the original cover 2 becomes smaller than standard angle.

Figure 15:
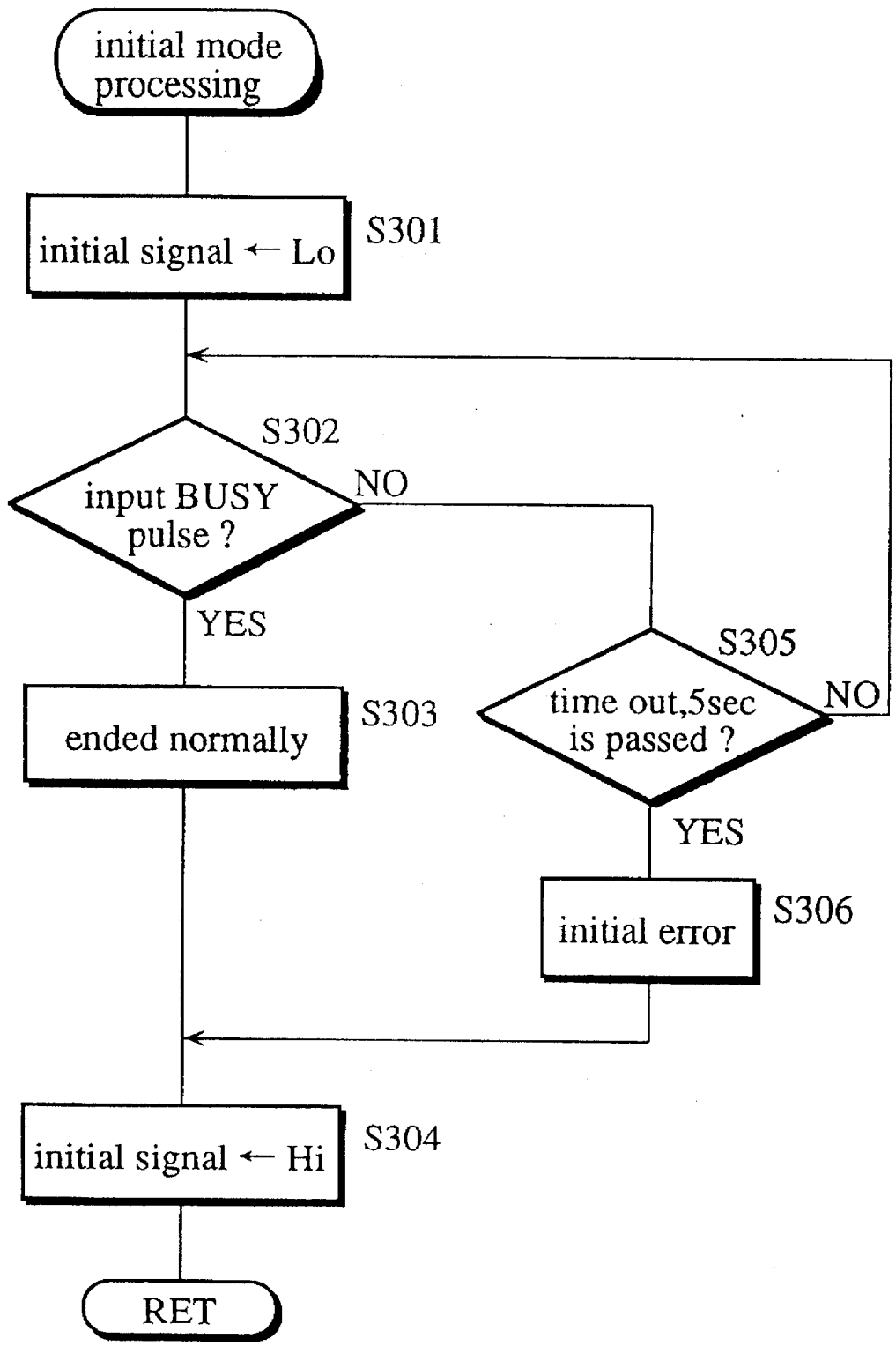
FIG. 15 is a flow chart depicting the initial mode subroutine at S108 in FIG. 13.

FIG. 15 shows a flow chart of the initial mode sub-routine at S108 in FIG. 13. Initial mode processing is described as referring to this flow chart.

Initial signal is set active (Low level) (S301) to direct the CPU 1 to start initial processing. If BUSY pulse has been inputted from the CPU 1 (S302: Yes), it is judged that the CPU 1 completes initial processing normally, so that it displays to notify the user of normal initial processing (S303).

If no BUSY pulse has been inputted (S302: No), the timer progresses by 5 sec. Then, if BUSY pulse is inputted before the timer is timed out (S302: Yes), it is judged that initial processing is completed normally. On the other hand, if no BUSY input is inputted before the timer is timed out (S305: Yes), initial processing takes so long that it is judged as an initial error, and notifies the user so with the control panel 4 or the like (S306).

Then, initial signal is set inactive (Hi) to direct the CPU 1 to end initial processing (S304).

In the embodiment, a copy machine illuminates image of an original document on a photosensitive drum PC by optical system. A device for converting image of an original document into digital data with a line sensor may be applicable to the above embodiment. More specifically, a contact type document reading device which constructs a CCD line sensor on a slider which moves along scanning glass, and reads image of an original document by moving the slider may be applicable. An original document reading device which has a CCD line sensor fixed to itself and has a reflection mirror on a slider, and guides image of an original document into the CCD line sensor via the reflection mirror may be also applicable.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An original document reading device comprising:

a transparent original table which has an area onto which an original document is disposed;

a plurality of sensors for measuring optically as for a certain position of the original table which corresponds to a size of the original document disposed on original document table, then outputting a measuring value;

an original document size deciding means which includes a memory for storing a threshold value which corresponds to each sensor and a first CPU for implementing a program for original document size detection, for judging if an original document is disposed on each certain position of the original document table by comparing each measuring value from the plurality of sensors with the threshold value, and for deciding the size of the original document on the original document table according to the judged result, and for outputting data representing the decided size of the original document, said memory being connected to said first CPU; and a main unit controlling means which includes a second CPU for implementing a program for original document reading control, for receiving the data representing the decided original document size from the original document size deciding means, and for controlling operation of the original document reading device.

2. The original document reading device of claim 1, wherein each sensor comprises a light emitting element and a location detecting element, and wherein each sensor measures a distance as for each certain position of the original document table.

3. The original document reading device of claim 1, wherein said memory and said first CPU are included in a first board, and said second CPU is included in a second board different from said first board.

4. An original document reading device comprising:

a transparent original table which has an area onto which an original document is disposed;

a plurality of distance each sensors for optically measuring distance to an object therefrom at a certain position of the original document table which corresponds to a size of the original document disposed on the original document table, then outputting a measuring value;

an original document size deciding means for specifying which distance sensor measures the original as the object by comparing the measuring value outputted from the distance sensor with the predetermined distance, for deciding the original document size according to the position of the specified distance sensor, and for outputting data indicative of the decided original document size; and a main unit controlling means for controlling operation of the original document reading device according to the data indicative of the decided original document size from the original document size deciding means.

5. The original document reading device of claim 4, wherein each of the plurality of distance sensors includes a light emitting element for emitting light to a certain position of the original document table, and a location detecting element for receiving reflection of the light from the light emitting element, each sensor measuring distance to a position where the light is reflected according to a position where the reflection of the light is received, and each sensor outputting the measuring value.

6. The original document reading device of claim 5, wherein each of the plurality of distance sensors includes a plurality of light emitting elements and a single location detecting element in which the plurality of light emitting elements emit light to the certain positions of the original document table, and the location detecting element receives the reflection of the light emitted from the plurality of light emitting elements, measures the distance to each reflection position according to the position where the reflection of the light is received, and outputs the measuring value.

* * * * *

UNITED STATES PATENT AND TRADEMARK OFFICE
CERTIFICATE OF CORRECTION

PATENT NO. : 5,693,933
DATED : December 2, 1997
INVENTOR(S) : Akira TAKASU, et al.

It is certified that error appears in the above-identified patent and that said Letters Patent is hereby corrected as shown below:

On the title page, item [54] and column 1, line 1, delete "dtecting" and insert --detecting--.

Column 11, line 60, delete "original table" and insert --original document table--.

Column 11, line 62, delete "sensors for measuring" and insert --sensors each for measuring--.

Column 11, line 63, delete "original table" and insert --original document table--.

Column 11, lines 64 and 65, delete "original document table" and insert --the original document table--.

Column 12, line 30, delete "each sensors" and insert --sensors each--.

Signed and Sealed this

Seventh Day of July, 1998

Attest:

*Attesting Officer*

BRUCE LEHMAN
*Commissioner of Patents and Trademarks*